UNITED STATES PATENT OFFICE 2,728,737
Patented Dec. 27, 1955

2,728,737

POLYAMIDE SUSPENSOID

Harold Wittcoff, Minneapolis, Minn., assignor to General Mills, Inc., a corporation of Delaware No Drawing. Application January 2, 1951,
Serial No. 204,091

8 Claims. (Cl. 260—29.2)

This invention relates to new compositions of matter comprising polyamide or polyamide-polyester resins dispersed to a very high degree in an aqueous medium. These dispersions are hereinafter referred to as suspensoids and are composed of a solid phase of polyamide or polyamide-polyester resin particles and of a liquid aqueous phase. The invention relates further to a highly simplified and improved procedure for preparing these suspensoids.

Polyamide compounds are resinous compositions prepared by interacting a di- or polyfunctional amine with a di- or polyfunctional acid. Most commonly dibasic acids or other acid derivatives capable of forming amides, and diamines are used to give essentially linear compositions whose properties may vary markedly depending upon the reagents employed. Thus polyamides having fiber-forming characteristics may be prepared from reagents such as those with 6 and 10 carbon atoms. In contrast to these compositions, polyfunctional acids derived from higher unsaturated fatty acids by polymerization and containing, for example, 36 carbon atoms in the case of the dimer, 54 carbon atoms in the case of the trimer, or higher multiples of 18 in the case of higher polymers, are useful in the preparation of polyamides which are valuable in many applications including the adhesive and coating fields.

Polyamide-polyesters are polymeric materials containing mixed ester and amide groups and may be prepared from polybasic acids such as polymeric fat acids, and an alkanolamine such as monoethanolamine, or a mixture of an aliphatic polyamine and a polyhydric alcohol such as a mixture of ethylene diamine and ethylene glycol.

While some of the polyamides derived from diabasic acids having a low number of carbon atoms are useful for fiber spinning operations in the production of cloth, other polyamides of essentially the same type are also useful in coating operations, for example, in the coating of wire or of other metal parts. The polyamides derived from polymeric fatty acids are useful principally for coating or adhesive operations. Heretofore considerable difficulties have been attendant the use of these polyamides for these coating and adhesive purposes. The polyamides in general are high melting and even those derived from the polymeric fat acids melt at temperatures approaching the boiling point of water and extending even well above the boiling point of water. The polyamides derived from the shorter chain dibasic acids melt at temperatures far in excess of the boiling point of water. It is apparent that the application of melted polyamides having these characteristics to surfaces as coatings or adhesives requires rather elaborate equipment which may not be readily available to many processors. Furthermore, this hot melt application is prone to be an untidy and rather wasteful procedure. Moreover, temperature control in hot melt applications is essential involving a further item of cost in equipment.

The other way in which these polyamides have been applied for coating and adhesive purposes has been from solution. It is well known that many polyamides, particularly those derived from short chain dibasic acids, have very limited solubility and that a very limited choice of solvents is available. In the case of the polyamides derived from the long chain polymeric acids derived from fatty acids the solubility is improved substantially, but nonetheless disadvantages are attendant the use of the solvent application method. The solvents are costly and are frequently not recoverable in a practical manner. Furthermore, the solvents present both fire and toxicity hazards.

It has been highly desirable, therefore, to have polyamide resins available in a form in which they may be used without resort to either hot melt application or solvent application. Previous attempts have been made to emulsify polyamide resins by means of the ordinary emulsifying agents. These, however, resulted in compositions which produced tacky coatings. Furthermore, difficulties were encountered in these emulsification techniques in view of the fact that the polyamide resin melted at temperatures in excess of the boiling point of water and in view of the fact that it was essential to actually have the water and the polyamide together in liquid phases in order to carry out the emulsification. Further attempts were made to overcome these difficulties by employing solvent solutions of the polyamide for the purpose of carrying on the emulsification at lower temperatures. These again resulted in the production of compositions which produced tacky films. There has been, therefore, no satisfactory method for effecting the emulsification of polyamide resins.

It is therefore an object of the present invention to provide new compositions of matter containing polyamide or polyamide-polyester resins highly dispersed in an aqueous medium.

It is a further object of the invention to provide procedures for producing such compositions, said procedures being operable without the addition of external emulsifying agents and without the requisite addition of solvents previously considered necessary in producing polyamide emulsions.

It is a further object of the present invention to provide a process for emulsifying polyamide resins in which it is not necessary to maintain the polyamide in a liquid phase during the emulsification.

It is a further object of the present invention to provide polyamide suspensoids capable of producing films which are not tacky.

It is a further object of the present invention to provide a procedure for emulsifying polyamides which procedure is capable of wide variation including the use of a wide variety of compounding substances, many of which are not necessarily compatible with the polyamide resin.

The present invention overcomes the disadvantages pointed out above for the prior art methods of applying polyamide, by providing a suspensoid of polyamide. By this means it is possible to apply the polyamide to the surface being coated by the simple application of the aqueous mixture at ordinary temperatures and by means of ordinary coating equipment. This equipment is of the type commonly used in the application of water soluble glues and adhesives and is therefore already available to most coated paper manufacturers or may be procured at low cost. The product eliminates the use of dangerous and expensive solvents previously required by the solvent application method. Numerous other advantages also are obtained by the present invention. The compositions are relatively free from odor as contrasted to the odor of the resin itself and of solutions of the resin. Furthermore, the method of application eliminates the odors which are encountered in the hot melt application. The suspensoids of the present invention may be opaque white materials even where the polyamide employed may be dark in bulk form. Furthermore, by means of the present invention it is possible to vary quite considerably the viscosities of the suspensoids by variations in the amount of polyamide dispersed as well as by the use of various viscosity controlling constituents which are compatible with the suspensoids. Further variations which depend on the type of polyamide used include the particle size, flow characteristics, drying time, stability and compounding characteristics of the compositions. By these means control is possible over the nature of the suspensoid, particularly in respect to particle size, such that in a coating operation the solid polyamide may be retained on the surface of the material being coated or may actually migrate into the body of the material being coated where the latter is of a porous nature. This is particularly important in applications of polyamides to such materials as paper where in some instances it is desired to maintain the coating entirely upon the surface, as for example where the material is desired for an adhesive, and also for those applications in which the polyamide is intended to strengthen the paper, in which case it may be desirable to have the polyamide actually penetrate into the body of the paper. In solvent applications the polyamide tends to penetrate throughout the body being coated and it is a practical impossibility to localize the coating to the surface. On the other hand, in the hot melt application the tendency is for the polyamide to remain entirely at the surface and it is practically impossible to get any extensive migration of the molten polyamide into the body of the material being coated.

Although the invention described herein applies to polyamides in general, and to mixed polyamide-polyester resins, the preferred compositions relate to polyamides derived from polymerized higher unsaturated fatty acids. Polyamides of this type are disclosed in Cowan et al. Patent 2,450,940, and in general the polyamides disclosed in that patent are useful in the present invention. These polyamides are derived from polymeric fatty acids such as the polymerized fatty acids resulting from the polymerization of drying or semi-drying oils, or the free acids or simple aliphatic alcohol esters of the acids of such oils as linseed, tung, perilla, oiticica, cottonseed, corn, tall, sunflower, safflower, dehydrated castor oils. In the polymerization process the fatty acids with sufficient double bond functionality combine for the most part probably by a Diels-Alder mechanism to provide a mixture of dibasic and higher polymeric acids. The acids with insufficient functionality to react remain as monomers and may be removed by distillation. The residue after distillation consists of the desired polymeric acids and this mixture is used for the preparation of the polyamide resin by reaction with a suitable polyfunctional amine such as ethylene diamine. Ordinarily polyamides of this type have molecular weights varying from 3,000–10,000 and are resistant to the corrosive action of water, alkali, acids, oils, greases, and organic solvents. In instances where the resins contain free or excess amine as is hereinafter described, the molecular weight may be as low as 1,000.

Resins of this nature have found wide usage in industry, particularly as hot melt adhesives and as paper coatings where they demonstrate good moisture vapor and grease resistance. They serve also as laminating agents for a variety of materials including foil, paper, plastics and cork, as electrical insulators and as shellac substitutes for wood sealing. They have found further application as temporary or permanent protective coatings, particularly in instances where application by hot dipping is feasible. By and large, however, the most important application, at least for the polyamides prepared from diamines and polymerized vegetable oil fatty acids, has involved use as hot melt adhesives where numerous desirable properties have been demonstrated including low heat sealing temperature and excellent bonding properties.

The present invention depends upon the wholly unexpected observation that organic and inorganic bases will combine with free or excess carboxyl groups in polyamide resins or in polyamide-polyester resins to form salts, and that the polyamide compositions prepared by the addition of such small quantities of bases to polyamides containing free or excess carboxyl groups disperse very readily of their own accord simply by heating and stirring them with water. This dispersion takes place despite the fact that the melting point of the resin may exceed the boiling point of water and furthermore takes place without any external emulsifying agent being added whatsoever. It is postulated that the salts which form are highly efficacious internal emulsifying agents. This theory, however, has not been fully established and accordingly it will be appreciated that the invention is not limited to any particular theory or mechanism. It is nonetheless an established fact that the dispersion does occur under the conditions described. This observation that dispersion proceeds despite the fact that the resin may be in a solid state is entirely unexpected since prior attempts to secure dispersion require that the polyamide be in a liquid phase.

Previous reference has been made to the reaction of bases with free or excess carboxyl groups. As used herein the term "excess carboxyl groups" is intended to cover carboxyl groups which are present in the resin from the incorporation into the reaction mixture used for producing the resin a quantity of polycarboxylic acid in excess of that stoichiometrically required. When excess acid is used the amidification is ordinarily carried to substantial completion resulting in a low amine number. The term "free carboxyl groups" on the other hand, is intended to cover unreacted carboxyl groups present in the resin as a result of incomplete amidification. The term "carboxyl number" is defined as the number of milligrams of KOH equivalent to the free or excess carboxyl groups present in one gram of the resin. It is possible to obtain dispersions with resins whose acid numbers are as low as 1 or as high as 100. With very low acid numbers, however, the dispersions tend to be unstable. In general, accordingly, it is desirable to use a resin with an acid number above 10. The maximum acid number is about 100.

The process of preparing the suspensoids involves the mere addition of the polyamide to water containing a small amount of base, followed by heating and stirring of the resultant mixture. As a result of this simple procedure dispersion of the polyamide occurs. It is preferred, however, to melt the polyamide resin prior to its admixture with the water and acid. In most instances the polyamide does not remain in molten condition in admixture with the water since its melting point is usually considerably higher than that of the boiling point of water. It is usually, however, in a soft or plastic but nonetheless solid condition. Notwithstanding the fact that the polyamide may solidify in contact with the water, it still disperses in the water to produce a suspensoid of a stable nature. It will be appreciated that the invention is also applicable to the emulsification of such polyamides as are liquid below the boiling point of water, and in such cases it is convenient to carry out the emulsification when the polyamide is in the liquid phase.

It has been observed that a fine degree of dispersion is obtained when dispersion is effected above the melting point of the polyamide. Where the melting point of the polyamide is above the boiling point of water, it may be necessary to operate under pressure in order to obtain the finer degree of dispersion. For example, it has been found that a polyamide derived from polymeric fat acids, having a melting point of around 115° C. may be dispersed to a finer particle size than is obtainable when the polyamide is dispersed at a temperature below the boiling point of water, by employing temperatures in excess of the melting point of the polyamide. This is also true of the nylon type polyamides. Stable suspensoids of these types of polyamides are obtainable around 100° C. but the particle size is somewhat larger than is obtainable at higher temperatures. Where optimum polymer length already exists, application of high temperature and pressure for undue lengths of time should be avoided because of the danger of hydrolysis. If, on the other hand, the polymer size is excessively large such conditions may be used as a means of degrading the polymer to the desired size.

The limits of the acid number mentioned above are intended to designate only the average values. It will be appreciated that resins whose acid numbers are 0 may be emulsified merely by melting them together with resins with appreciable acid numbers. These compositions are emulsifiable as long as the average acid number of the resin falls within the above indicated limits.

When the acid number of a polyamide resin to be dispersed is appreciable and is due to incomplete amidification of the carboxyl groups, it may be found that such polyamides have lower melting points and lower hardnesses than do polyamides where the degree of amidification is more nearly complete. It is possible to raise the melting point and hardness of the polyamide while maintaining the same degree of reaction by employing other polybasic acids in the reaction mixture. For example, in a polyamide composition derived from polymeric fatty acids, it is possible to raise the melting point and hardness of the composition by the incorporation of from 1–15% of other dibasic acids, such as sebacic acid, in the reaction mixture. This increase in the melting point and hardness results even though the reaction is not carried to any further degree.

In the preparation of the suspensoid a wide variety of basic materials may be employed, including inorganic bases such as sodium and potassium hydroxides and carbonates, and organic bases such as monoamines, particularly aliphatic monoamines, morpholine, pyridine, triazole, and the like. The amount of base is not critical. The employment of a small quantity of base will result in some dispersion of the polyamide and the amount of dispersion obtained will increase with the amount of base until a certain maximum beyond which further addition of base does not increase the total amount of polyamide dispersed. The quantity of base for complete dispersion, however, is not necessarily enough to neutralize all of the carboxyl groups, although optimum stability does result when all of the carboxyl groups are neutralized. In the case of polyamides of very low acid number, such as those having acid numbers of 1 to 5, the amount of base which is added will necessarily be enough to neutralize completely the acid number. In the case of polyamides having higher acid numbers, adequate dispersion may be obtained with far less base than is necessary for complete neutralization of the polyamide. It is, of course, possible to add excess base, in which case the polyamide dispersion would be on the basic side. It is apparent, therefore, that it is possible to produce dispersions which are either alkaline, neutral, or acid.

In the preparation of the suspensoid the base may be first added to the water, after which the polyamide may be introduced into the mixture. It is also possible to incorporate the base into the molten resin at the time of its manufacture and near the end of the resin reaction. In this case it is necessary only to contact intimately the resin with water to obtain a suspensoid. In general practice it is simplest to combine all of the ingredients and then to heat them to the proper temperature with stirring.

A great variety of materials may be added to the suspensoid. In the first category are water soluble or water dispersible substances such as all types of polyvinyl alcohols; polyvinyl alkyl ethers such as polyvinyl methyl ether; polyalkylene glycols such as polyethylene glycol, and their esters and ethers; cellulose derivatives such as methyl cellulose, ethyl cellulose, hydroxyethyl cellulose, and carboxymethyl cellulose; starch derivatives such as carboxymethyl starch, modified starch, dextrins; and various gums such as karaya, locust bean, tragacanth; Irish moss; and the like. These materials may be added directly to the suspensoid after it has been formed, or else may be incorporated into the water used in the formation of the suspensoid. The latter procedure is preferable when large quantities of the additives are to be used, whereas the former procedure works well for smaller quantities. These materials, for the most part, serve not only to increase the viscosity of the suspensoid, but also to provide firmer adhesion of the suspensoid film to a surface thus preventing cracking and "dusting."

In addition to the water soluble or water dispersible materials mentioned above, a great variety of compounding ingredients may be used which ordinarily are neither soluble nor dispersible in water. These compounding ingredients may be entirely compatible, somewhat compatible, or entirely incompatible with the polyamide resin. Nonetheless they may become constituents of the suspensoid either by incorporation into the polyamide resin prior to the emulsification, or else by addition to the suspensoid once it has been formed. Herein lies an obvious advantage of the invention, since many materials such as elastomeric substances which are not normally compatible with polyamide resins become entirely compatible when, in the form of suspensoids or emulsions, they are mixed with polyamide suspensoids.

The compounding ingredients most commonly used in polyamides may be divided into three groups including tackifiers, plasticizers and plasticizing resins, and waxes. Obviously there may be a great overlapping among these three categories, although normally the function of a given additive is fairly well defined. Although great leeway is possible in the amount and ratio of additives which may be used, it has been observed that the best results are obtained when the composition contains a minimum of 40% of polyamide resin, based on the compounded resin. Useful compositions are, however, obtainable with even less than 40% of polyamide resin. For best results in most applications, however, the 40% minimum is preferred.

The waxes which may be used for compounding purposes include paraffin wax, other hydrocarbon waxes of all types, montan wax, opal wax, candelilla wax, carnauba wax, beeswax, and a great variety of synthetic waxes. In general, however, paraffin wax because of its low price and good properties is the most useful.

The plasticizers which may be employed include a great variety of sulfonamides, such as N-ethyl toluenesulfonamides, tributyl phosphate, tricresyl phosphate, triethyl phosphate, dibutyl phthalate, dioctyl phthalate, dicapryl phthalate, dibenzyl sebacate, 2-ethylhexanediol-1,3, a great variety of rosin derivatives which may also act as tackifiers and which are listed below under tackifiers, a great variety of alkyd type resins such as glycerol-castor oil acids-sebacic acid alkyd, dioctyl sebacate, tall oil, chlorinated hydrocarbons, phenolic-type resins, coumarone-indene resins, and in general a great variety of commercial plasticizers of which the hydrocarbon and terpene types are important.

Tackifiers include many of the above plasticizers, especially when used in high percentages. Other examples are rosin, disproportionated rosin, hydrogenated rosin, polymerized rosin, rosin from tall oil; the glycol, glycerol, pentaerythritol, 2,2,6,6-tetramethylolcyclohexanol, and other polyhydric alcohol complete and partial esters of these rosins; maleic-modified rosins, and rosin esters, methyl and other alkyl esters of rosin, limed rosin, rosin alcohols and their esters, phenolic-type resin tri-(p-tert. butylphenyl) phosphate, coumarone-indene resins, chlorinated naphtalene, furfuryl alcohol, blown castor oil, and the like.

In the preparation of the suspensoid it is usually satisfactory merely to disperse the resin in water by means of heat and agitation. Sometimes it is desirable to supplement this agitation with the use of a colloid mill which serves the purpose of producing a suspensoid with particles of more uniform size.

The suspensoids are capable of concentration by removal of water, usually in vacuo in order to provide compositions with higher solids contents. Conversely the suspensoids may be diluted and for this dilution ordinary tap water is adequate. Dilution with solvents such as alcohols, hydrocarbons, ketones, esters, and the like, is also possible, and furthermore these solvents may be incorporated into the resin prior to dispersion. Dilution with these solvents is best accomplished by adding the solvent to the stirred suspensoid heated to 50° C. or higher. When these polyamides are used to cast films, presence of solvents, especially those which are solvents for polyamide resin, tends to provide continuous films since the films from some of the suspensoids are not continuous but rather are composed of discrete particles which usually are not discernible to the naked eye. It will be apparent that continuous films can also be produced from suspensoids which do not contain solvents by depositing the suspensoids as a film on the surface of the article to be treated, and by thereafter subjecting the film to temperatures above its fusion temperature. Continuous films prepared in this way demonstrate excellent vapor, water vapor, and grease resistance. The incorporations of plasticizers also leads to continuous films.

The films of the suspensoids as indicated previously, are entirely non-tacky, and do not block even under severe conditions of pressure, temperature, and humidity, when the resin involved is inherently non-tacky, as is the case with the resin prepared from ethylene diamine and dimerized vegetable oil fatty acids. When the resin is inherently sticky as is the case with resins prepared from diethylene triamine and the like, the suspensoid film is also tacky and is useful in the fabrication of wet seal adhesives. The suspensoids themselves demonstrate remarkable temperature stability since they may be frozen and thawed repeatedly without harm. Similarly they may be subjected to temperatures close to the boiling point of water and will still not coagulate.

As previously indicated, the suspensoids are capable of modification by a great many compounding ingredients. In addition, it is possible to add substances commonly used to increase moisture resistance, although this is not ordinarily necessary since the moisture resistance of the suspensoid films is quite good. Included in this group of compounds are dimethylol urea, glyoxal, cupric, sodium or ammonium dichromate, chromic acetate, stearato chromic chloride; castor oil, turkey red oil, and trimethylolmelamine. Furthermore, a great variety of dyes and pigments may be added to the suspensoids including not only water soluble and water dispersible dyes, but also oil soluble dyes which may be added to the suspensoid as a solution with vigorous agitation.

Of extreme importance, as has been mentioned above, is the compatibility which the suspensoids demonstrate toward suspensoids or emulsions of substances which are normally incompatible with polyamide resins. Included in this group of materials are elastomeric substances in particular. These include natural and synthetic latices of all sorts, such as natural rubber latex, polyisobutylene latex, butadiene latex, butadiene-styrene copolymer latex, isoprene latex, chloroisoprene latex, acrylonitrile-butadiene copolymer latex; resin emulsions or suspensoids such as those derived from polyvinyl butyral, polyethylene, polyfluoroethylene; terpene resins, acrylic resins such as polyacrylonitrile, polymethyl methacrylate, and the like; halogen-containing resins such as polyvinyl chloride; phenolic resins such as phenol formaldehyde resins; vegetable and mineral oils; asphalt; and the like.

As has been pointed out previously, certain polyamides have found wide use in industry particularly as adhesives and paper coatings. Despite their extensive acceptance in this field, they have been subject to certain disadvantages, particularly the inability of these polyamides to provide seals which are stable at low temperatures. They likewise have not been entirely satisfactory as an adhesive for sealing certain plastics to themselves and to other materials. Similarly there have been certain shortcomings of the other suspensoids mentioned above which are compatible with polyamide suspensoids. For example, natural and synthetic latices provide seals which are stable at low temperature, but they almost invariably form films which are extremely tacky and which block even at room temperature and without pressure. Furthermore, they seal at very high temperatures. Other films provide seals which are stable at low temperatures but are extremely brittle and have very poor moisture vapor resistance. Many of these difficulties encountered with polyamides alone and with the other polymeric materials alone are overcome by the combination of these polymeric materials with polyamide. The term "combination suspensoids" is used to indicate the compositions containing a polyamide suspensoid and a suspensoid or emulsion of one or more of the above-mentioned polymers. The use of suspensoids or emulsions of these polymeric materials and of polyamides permits the materials to be mixed together even though they may be incompatible in their non-dispersed form.

There are numerous ways in which these combination suspensoids may be used to overcome the limitations of the individual materials themselves. For example, it has been found that when a latex is combined with a polyamide suspensoid there results a composition which seals at a low heat-seal temperature and which not only provides seals stable at a very low temperature but also provides films which demonstrate no tackiness or blocking whatsoever even under conditions of relatively severe temperature, pressure and humidity. In contrast to this observation the polyamide by itself has very poor sealing characteristics at low temperature and the latex by itself is extremely subject to blocking at room temperature even without the application of pressure. Furthermore, the latex seals at a very high temperature.

A further advantage of this phase of the invention is that the combination suspensoids demonstrate sealing ranges which are much broader than the sealing ranges of the individual constituents which form the suspensoids. By regulating the relative proportions of each of the constituents and by means of compounding, it is possible to vary the sealing range quite widely to provide a product which will seal at the temperature desired. A further advantage of this phase of the invention is that the mixed suspensoids may be compounded to provide adhesives which demonstrate "delayed tack." Furthermore, the invention provides for the extension of the utility of various latices and of similar resin suspensoids since the polyamide suspensoid when mixed with these suspensoids serves to remove all semblance of tack from the resulting films and therefore renders these materials useful in applications in which they were not previously useful in view of the tackiness of the resulting film. Moreover, the polyamide suspensoid when mixed with these other polymeric suspensoids and emulsions may be used to lower the sealing range of the other polymeric suspensoids which is an extremely important effect since many latices, for example, seal at temperatures sufficiently high to weaken the surface to which the material has been applied.

As was indicated above, the polyamide suspensoids are stable to freezing and may be repeatedly frozen and thawed without danger of coagulation. The polyamide suspensoids contribute this stability toward freezing to combination suspensoids. Thus latices are notoriously unstable to freezing and polyamide suspensoids have the ability of combining with such latices to produce a composition which is less prone to be deleteriously affected by freezing than is the latex itself. The degree of improvement depends on the ratio of the two suspensoids.

The preparation of the mixed suspensoids is extremely simple and involves only the admixture of the constituent suspensoids or emulsions. This may be accomplished in virtually any kind of mixer normally used in engineering practice. In some circumstances it may be desirable to pass the mixture through a colloid mill, although in general this is entirely unnecessary.

While it has been indicated previously that many of the materials employed as suspensoids for admixture with polyamide suspensoid are normally incompatible or only very slightly compatible with the polyamide resin itself, this is not intended to be a limitation of the invention inasmuch as the invention contemplates also combinations of polyamide suspensoids with other resin suspensoids or emulsions, said resins normally being compatible with polyamide resin. The preferred combination suspensoid compositions include mixtures of polyamide resin suspensoid with natural or synthetic rubber latices and with polymer dispersions in general, especially those which are dispersed with non-ionic or anionic agents. The synthetic rubber latices may be made from the polymerization or copolymerization of butadiene, styrene, isoprene, acrylonitrile, chloroisoprene, and the like. Other suspensoids or emulsions which may be mixed with polyamide suspensoid include those derived from asphalt, acrylic type polymers, vinyl-type polymers, allyl type polymers, phenolic resins, and in general, any polymeric material. In addition, water soluble or water dispersible polymeric materials such as polyvinyl alcohol, starch, cellulose, and starch and cellulose derivatives, such as carboxymethyl starch or cellulose, methyl cellulose, polyvinyl methyl ether, and a wide variety of similar materials may be incorporated.

Optimum results are obtained, as indicated above, when the suspensoids or emulsions to be added to the polyamide suspensoid are anionic or non-ionic in nature. When this is the case, it has been found that these materials may be mixed in virtually any concentration whatsoever. If the suspensions are cationic in nature, it may be necessary either to reverse the charge or else to limit the concentration or otherwise modify the composition. It has also been found possible in instances of limited stability to prepare the mixture of suspensoids directly before using. In this way it is possible to prepare mixed suspensoids of higher concentration than would be possible if the mixed suspensoids were to be allowed to stand for an extended period of time. If, however, the suspensoid has been prepared with an anionic or non-ionic emulsifying agent, it demonstrates a high degree of stability on admixture with polyamide resin suspensoid.

The ratio of the components of the combination suspensoids contemplated by the present invention depends entirely upon the properties which are ultimately desired. Thus it has been found that the addition of only 10% of butadiene-styrene copolymer latex serves to impart to the polyamide suspensoid the ability to provide seals on paper which are entirely stable at temperatures as low as $-30°$ C. On the other hand, the addition of as little as 10% of polyamide resin suspensoid overcomes to an appreciable extent the disadvantages of tackiness and the blocking characteristics of synthetic rubber latices. Likewise the addition of as little as 10% of polyamide suspensoid to a rubber latex serves to lower the sealing range of the latex appreciably. Ordinarily the sealing temperature of these latices is so high that its use is greatly limited. Furthermore, by blending the various constituents it is possible to obtain a wider variety of sealing ranges as well as broader limits of sealing temperature than ordinarily would be obtained with any of the constituents alone.

As indicated above, these compositions which result from the combination of polyamide resin suspensoids with other suspensoids or emulsions are valuable as adhesives for plastic films serving not only to bond the plastic films to themselves, but also to a wide variety of other surfaces. Thus cellophane, moisture-proof cellophane, and a wide variety of vinyl type polymer and copolymer films may be bonded either to themselves, to paper, or to other surfaces by means of the compositions described herein.

Although these compositions are valuable primarily as adhesives and as coating compositions, these products are applicable to a great number of other uses. Thus they may serve as binders for paper pulp, wood flour, leather scrap, asbestos, ground cork, or textile fibers, and the like. Likewise they are good binders for inorganic materials such as clay, sand, and plaster of paris. They may be incorporated directly into paper pulp for the manufacture of paper; they find application in the textile industry as textile finishing compounds or textile improvers. They find application also in the leather industry where a high degree of bond strength is required. These combination suspensoids may be easily diluted with water or with solvents. Furthermore, the viscosity may be increased by addition of the materials described above for increasing the viscosity of the polyamide suspensoids. These combination suspensoids may be modified by the addition of any of the large number of compounding ingredients listed above for the polyamide suspensoids.

The following examples will serve to illustrate the invention. The "dimerized soybean oil fatty acids" employed in these examples were a mixture of acids obtained by the polymerization of soybean oil fatty acids and contained approximately 10% monomer, approximately 69.5% dimer, and approximately 20.5% of higher polymers.

*Example 1*

A polyamide resin was prepared from 582.2 parts of dimerized soybean oil fatty acids and 103.2 parts of 92.1% diethylene triamine. The dimer acids were heated to 130° C. with stirring, after which the amine was added at a rate such that the temperature of the vapor which came off did not exceed 100° C. Upon completion of the addition of the amine, the temperature of the reaction mixture was raised slowly to 200° C., again at a rate such that the vapor temperature did not exceed 100° C. After the temperature reached 200° C., the reaction mixture was maintained there for 3 hours, and during the last hour vacuum was employed. The product had the following properties:

| | |
|---|---|
| Acid No. | 95 |
| Amine No. | 5.4 |
| Melting point (ball and ring) ° C. | 15.3 |
| Color (Gardner, 35% solution in toluene-butanol, 1:1) | 10 |
| Viscosity at 25° C. (Gardner-Holdt, same solution as for color) | A–3 |

An emulsion was made from this product by adding 50 parts of it as a melt to 90 parts of hot water containing 1.5 parts of morpholine. With vigorous stirring an excellent emulsion resulted which when coated on various surfaces provided a continuous tacky film, and which could be used as an excellent wet-stick adhesive.

Portions of this emulsion were mixed with each of the following latices, some of which were anionic and some of which were non-ionic: rubber latices, synthetic latices of elastomeric materials; polymer dispersions, such as acrylic dispersions; rosin and rosin ester emulsions; and the like. The emulsion of polyamide was found to be entirely compatible with these materials and was found to form stable suspensoids with these various latices and emulsions, and that the mixed suspensoids had the properties which were previously described for these particular products.

Example 2

A polyamide resin was prepared from 291.1 parts of dimerized soybean oil fatty acids and 34.4 parts of 92.1% diethylene triamine. The reaction was carried out as described in Example 1 to produce a polyamide having the following properties:

| | |
|---|---|
| Acid No | 61.4 |
| Amine No | 10.9 |
| Melting point (ball and ring) ° C | 46.0–50.0 |
| Color (Gardner, 35% solution in toluene-butanol, 1:1) | 10 |
| Viscosity at 25° C. (Gardner-Holdt, same solution as for color) | A–B |

The polyamide resin thus produced was emulsified as described in Example 1 employing 50 parts of the polyamide, 92 parts of water and 1.5 parts of morpholine. The dispersion yielded a smooth continuous film which was quite tacky and which could be used as a wet-stick adhesive.

Example 3

A polyamide resin was prepared from 305.9 parts of dimerized soybean oil fatty acids and 43.0 parts of 69.8% aqueous ethylene diamine. The reaction was carried out as described in Example 1 and the polyamide had the following properties:

| | |
|---|---|
| Acid No | 11.8 |
| Amine No | 2.2 |
| Melting point (ball and ring) ° C | 109.0 |
| Color (Gardner, 35% solution in toluene-butanol, 1:1) | 10–11 |
| Viscosity at 25° C. (Gardner-Holdt, same solution as for color) | B–C |

The suspensoid was made from this material by adding 25 parts of it in a molten state to 45 parts of hot water containing 1.0 part of morpholine. On vigorous stirring a portion of the polyamide was dispersed in the water. The suspensoid thus produced when separated from excess polyamide was found to be stable.

Example 4

A polyamide resin was prepared from 293 parts of dimerized soybean oil fatty acids, 40 parts of 67.6% aqueous ethylene diamine, and 5.9 parts of cottonseed fatty acids. The reaction was conducted as described in Example 1, and the polyamide produced had the following properties:

| | |
|---|---|
| Acid No. | 17.3 |
| Amine No. | 48.7 |
| Melting point (ball and ring) ° C | 103.2 |
| Color (Gardner, 35% solution in toluene-butanol, 1:1) | 10 |
| Viscosity at 25° C. (Gardner-Holdt, same solution as for color) | A–A1 |

25 parts of this polyamide were dispersed in 45 parts of water containing 1.0 part of morpholine in the manner described in Example 3. A suspensoid was formed which, when cast as a film, demonstrated excellent non-blocking and heat sealing properties.

Example 5

A polyamide resin was prepared from 349.2 parts of dimerized soybean oil fatty acids and 43.0 parts of 69.8% aqueous ethylene diamine. The reaction was carried out as described in Example 1 to produce a polyamide having the following properties:

| | |
|---|---|
| Acid No. | 31.1 |
| Amine No. | 0.2 |
| Melting point (ball and ring) ° C | 98.1 |
| Color (Gardner, 35% solution in toluene-butanol, 1:1) | 10–11 |
| Viscosity at 25° C. (Gardner-Holdt, same solution as for color) | A–1 |

This material was converted to a suspensoid by adding 250 parts of it in a molten state to 450 parts of hot water containing 10 parts of morpholine. On vigorous stirring a dispersion resulted which provided a film with excellent heat sealing properties for a wide variety of surfaces and with excellent non-blocking characteristics.

This example was duplicated employing triethanolamine in place of the morpholine. Similar results were obtained.

Example 6

A mixed suspensoid was prepared from a mixture of the polyamide resin described in Example 1 and a polyamide resin similarly prepared by the use of stoichiometric quantities of ethylene diamine and dimerized soybean oil fatty acids. The latter polyamide possessed virtually no excess functional groups. Fifty parts of each of these polyamides were melted together and were added with vigorous stirring to 180 parts of hot water containing 3 parts of morpholine. A suspensoid resulted demonstrating that an ordinary undispersible material such as the polyamide resin without excess functional groups can be dispersed in the presence of the dispersible resins described herein.

I claim as my invention:

1. A suspensoid in an aqueous medium of a polyamide having the polyacyl group of polymerized polyene fatty acids, and the polyamino group of an aliphatic polyamine, the polyamide having a molecular weight within the approximate range of 1,000 to 10,000, said polyamide having a carboxyl number within the approximate range of 1–100 and being dispersed in the aqueous medium by means of sufficient alkaline material to react with carboxyl groups in the polyamide to form salt groups to stabilize the suspensoid.

2. A suspensoid in an aqueous medium of a polyamide containing the polyacyl group of polymerized polyene fatty acids, and the polyamino group of ethylene diamine, the polyamide having a molecular weight within the approximate range of 1,000 to 10,000 and having a carboxyl number of from 10 to 100, said polyamide being dispersed in the aqueous medium by means of sufficient morpholine to react with carboxyl groups in the polyamide to form salt groups to stabilize the suspensoid.

3. A suspensoid in an aqueous medium of a polyamide containing the polyacyl group of polymerized polyene fatty acids, and the polyamino group of diethylene triamine, the polyamide having a molecular weight within the approximate range of 1,000 to 10,000 and having a carboxyl number of from 10 to 100, said polyamide being dispersed in the aqueous medium by means of sufficient morpholine to react with carboxyl groups in the polyamide to form salt groups to stabilize the suspensoid.

8, inclusive, is also applicable here. Accordingly, I have,

4. The combination of a natural aqueous rubber latex and a suspensoid in an aqueous medium of a polyamide having the polyacyl group of polymerized polyene fatty acids, and the polyamino group of an aliphatic polyamine, the polyamide having a molecular weight within the approximate range of 1,000 to 10,000, said polyamide having a carboxyl number in the range of 10 to 100 and being dispersed in the aqueous medium by means of sufficient alkaline material to react with carboxyl groups in the polyamide to form salt groups to stabilize the suspensoid.

5. The combination of a synthetic aqueous rubber latex selected from the group consisting of anionic and non-ionic synthetic latices, and a suspensoid in an aqueous medium of a polyamide having the polyacyl group of polymerized polyene fatty acids, and the polyamino group of an aliphatic polyamine, the polyamide having a molecular weight within the approximate range of 1,000 to 10,000, said polyamide having a carboxyl number in the range of 10 to 100 and being dispersed in the aqueous medium by means of sufficient alkaline material to react with carboxyl groups in the polyamide to form salt groups to stabilize the suspensoid.

6. The process of producing a polyamide suspensoid which comprises melting a polyamide having the polyacyl group of polymerized polyene fatty acids and the polyamino group of an aliphatic polyamine, the polyamide having a molecular weight within the approximate range of 1,000 to 10,000 and having a carboxyl number within the approximate range of 1–100, and dispersing said molten polyamide in an aqueous medium at an elevated temperature in the presence of sufficient alkaline material to react with carboxyl groups in the polyamide to form salt groups to stabilize the suspensoid.

7. The process of producing a polyamide suspensoid which comprises melting a polyamide containing the polyacyl group of polymerized polyene fatty acids and the polyamino group of ethylene diamine, the polyamide having a molecular weight within the approximate range of 1,000 to 10,000 and having a carboxyl number in the range of 10 to 100, and dispersing said molten polyamide in an aqueous medium at an elevated temperature in the presence of sufficient morpholine to react with carboxyl groups in the polyamide to form salt groups to stabilize the suspensoid.

8. The process of producing a polyamide suspensoid which comprises melting a polyamide containing the polyacyl group of polymerized polyene fatty acids and the polyamino group of diethylene triamine, the polyamide having a molecular weight within the approximate range of 1,000 to 10,000 and having a carboxyl number in the range of 10 to 100, and dispersing said molten polyamide in an aqueous medium at an elevated temperature in the presence of sufficient morpholine to react with carboxyl groups in the polyamide to form salt groups to stabilize the suspensoid.

References Cited in the file of this patent

UNITED STATES PATENTS

| | | |
|---|---|---|
| 2,467,186 | Cairns | Apr. 12, 1949 |
| 2,484,416 | Martin | Oct. 11, 1949 |
| 2,613,156 | McGaffin et al. | Oct. 7, 1952 |

FOREIGN PATENTS

| | | |
|---|---|---|
| 458,389 | Canada | July 26, 1949 |
| 113,909 | Australia | Sept. 23, 1941 |

OTHER REFERENCES

Polyamide Resin Suspensoids, Department of Plastic Technology, India Rubber World, May 1951, pages 189–191.